(12) United States Patent
Venkatramani et al.

(10) Patent No.: US 7,996,597 B1
(45) Date of Patent: Aug. 9, 2011

(54) MAPPING ADDRESS BITS TO IMPROVE SPREAD OF BANKS

(75) Inventors: Anjan Venkatramani, Los Altos, CA (US); Srinivas Perla, San Jose, CA (US); John Keen, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 466 days.

(21) Appl. No.: 11/829,642

(22) Filed: Jul. 27, 2007

Related U.S. Application Data (60) Provisional application No. 60/911,974, filed on Apr. 16, 2007.

(51) Int. Cl.
G06F 12/06 (2006.01)
(52) U.S. Cl. ..... 711/5; 711/157; 711/202; 711/E12.058; 711/E12.079
(58) Field of Classification Search .............. 711/5, 216, 711/E12.06, E12.066, E12.079, 157, 210; 345/573
See application file for complete search history.

(56) References Cited

U.S. PATENT DOCUMENTS

| | | | | |
|---|---|---|---|---|
| 5,287,470 | A * | 2/1994 | Simpson ..................... | 345/540 |
| 5,390,308 | A * | 2/1995 | Ware et al. .................. | 711/5 |
| 5,649,143 | A * | 7/1997 | Parady ........................ | 711/220 |
| 6,108,745 | A * | 8/2000 | Gupta et al. ................. | 711/3 |
| 6,553,478 | B1 * | 4/2003 | Grossier ..................... | 711/209 |
| 6,604,166 | B1 * | 8/2003 | Jana et al. ................... | 711/5 |
| 7,266,651 | B1 * | 9/2007 | Cypher ....................... | 711/157 |
| 7,398,362 | B1 * | 7/2008 | Tischler ..................... | 711/157 |
| 2003/0196026 | A1 * | 10/2003 | Moyer ....................... | 711/103 |

OTHER PUBLICATIONS

Zhao Zhang, Zhichun Zhu, and Xiaodong Zhang. "Breaking Address Mapping Symmetry at Multi-levels of Memory Hierarchy to Reduce DRAM Row-buffer Conflicts." 2002. Journal of Instruction-Level Parallelism. vol. 3.*
Jun Shao and Brian T. Davis. "The Bit-reversal SDRAM Address Mapping." 2005. ACM. SCOPES '05.*
Wei-fen Lin, Steven K. Reinhardt, and Doug Burger. "Reducing DRAM Latencies with an Integrated Memory Hierarchy Design." Jan. 2001. IEEE. HPCA '01.*
Zhao Zhang, Zhichun Zhu, and Xiadong Zhang. "A Permutation-based Page Interleaving Scheme to Reduce Row-buffer Conflicts and Exploit Data Locality." 2000. IEEE. MICRO 2000.*
John L. Hennessy and David A. Patterson. Computer Organization and Design. 1998. Morgan Kaufmann. pp. 540-541 and 544.*
Eero Aho, Jarno Vanne, Kimmo Kuusilinna, Timo Hamalainen, and Jukka Saarinen. "Configurable Address Computation in a Parallel Memory Architecture." Jul. 2001. WSEAS. CSCC 2001.*
G.S. Sohi, "Logical Data Skewing Schemes for Interleaved Memories in Vector Processors", Computer Sciences Technical Report #753, Feb. 1988, 23 pages.
J. Liedtke, "Colorable Memory", IBM T.J. Watson Research Center, Nov. 10, 1996, 4 pages. J.M. Frailong et al., "XOR-Schemes: A Flexible Data Organization in Parallel Memories", 1985 International Conference on Parallel Processing, IEEE Computer Society, pp. 276-283, Aug. 1985.

* cited by examiner

Primary Examiner — Reginald G Bragdon
Assistant Examiner — Nathan Sadler
(74) Attorney, Agent, or Firm — Harrity & Harrity, LLP (57) ABSTRACT

A device may include a group of requestors issuing requests, a memory that includes a set of memory banks, and a control block. The control block may receive a request from one of the requestors, where the request includes a first address. The control block may perform a logic operation on a high order bit and a low order bit of the first address to form a second address, identify one of the memory banks based on the second address, and send the request to the identified memory bank.

30 Claims, 12 Drawing Sheets

| ADDRESS | | BANK NO. (WITHOUT MAPPING FUNCTION) | BANK NO. (WITH MAPPING FUNCTION) |
|---|---|---|---|
| 0 | DATA SLOT 1 | 1 | 1 |
| 1 | DATA SLOT 2 | 2 | 2 |
| 2 | DATA SLOT 3 | 3 | 3 |
| ⋮ | ⋮ | ⋮ | ⋮ |
| | UNUSED DATA SLOTS | | |
| 15 | | 8 | 8 |
| 16 | DATA SLOT 1 | 1 | 2 |
| 17 | DATA SLOT 2 | 2 | 1 |
| 18 | DATA SLOT 3 | 3 | 4 |
| ⋮ | ⋮ | ⋮ | ⋮ |
| | UNUSED DATA SLOTS | | |
| 31 | | 8 | 7 |
| 32 | DATA SLOT 1 | 1 | 3 |
| 33 | DATA SLOT 2 | 2 | 4 |
| 34 | DATA SLOT 3 | 3 | 1 |
| ⋮ | ⋮ | ⋮ | ⋮ |
| | UNUSED DATA SLOTS | | |
| 47 | | 8 | 6 |
| 48 | DATA SLOT 1 | 1 | 4 |
| ⋮ | ⋮ | ⋮ | ⋮ |

DATA SET 1: addresses 0–15
DATA SET 2: addresses 16–31
DATA SET 3: addresses 32–47

MAPPING ADDRESS BITS TO IMPROVE SPREAD OF BANKS

RELATED APPLICATION

This application claims priority from U.S. Provisional Application No. 60/911,974, filed Apr. 16, 2007, entitled "MEMORY SCHEMES," the content of which is hereby incorporated by reference.

BACKGROUND

Network devices, such as routers, receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet the new demands. For example, as new functions, such as accounting and policing functionality, were added to the software, these routers suffered performance degradation. In some instances, the routers failed to handle traffic at line rate when the new functionality was added.

To meet the new demands, purpose-built routers were designed. Purpose-built routers are designed and built with components optimized for routing. These routers not only handle higher line rates and higher network traffic volume, but they also add functionality without compromising line rate performance.

SUMMARY

According to one aspect, a data processing device may include a group of requestors issuing requests, a memory that includes a set of memory banks, and a control block. The control block may receive a request from one of the requestors, where the request may include a first address. The control block may perform a logic operation on a high order bit and a low order bit of the first address to form a second address, identify one of the memory banks based on the second address, and send the request to the identified memory bank.

According to another aspect, a data processing device may include a group of requestors issuing requests, a memory that includes a set of memory banks, and a control block. The control block may receive a request from one of the requestors, where the request may include a first address. The control block may perform a mapping function on the first address to form a second address, where the mapping function may cause a set of contiguous addresses to be mapped to another set of contiguous addresses while spreading a set of non-contiguous addresses intended for a same one of the banks to multiple ones of the memory banks. The control block may identify one of the memory banks based on the second address, and send the request to the identified memory bank.

According to yet another aspect, a method may include receiving a request to read data from or write data to a memory that includes a group of memory banks, where the request may include a first address; performing a logic operation on a high order bit and a low order bit of the first address; forming a second address by replacing the low order bit of the first address with a result of the logic operation; identifying one of the memory banks based on the second address; and sending the request to the identified memory bank.

According to a further aspect, a device may include means for receiving a request intended for a memory, where the memory may include a group of memory banks, and the request may include a first address. The device may also include means for performing a first logic operation on a first particular bit of the first address and a second particular bit of the first address; means for performing a second logic operation on a third particular bit of the first address and a fourth particular bit of the first address; means for forming a second address based on the first address, a result of the first logic operation, and a result of the second logic operation; means for identifying one of the memory banks based on the second address; and means for sending the request to the identified memory bank.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Implementations described herein may provide techniques for spreading the access pattern of requests across banks of a memory, thereby improving efficiency. In the description to follow, the memory device will be described as a control memory of a network device that stores data structures for use in processing packets. In other implementations, the memory device may be included in another type of data processing device and may store other types of data.

Exemplary Data Processing Device

Figure 1:
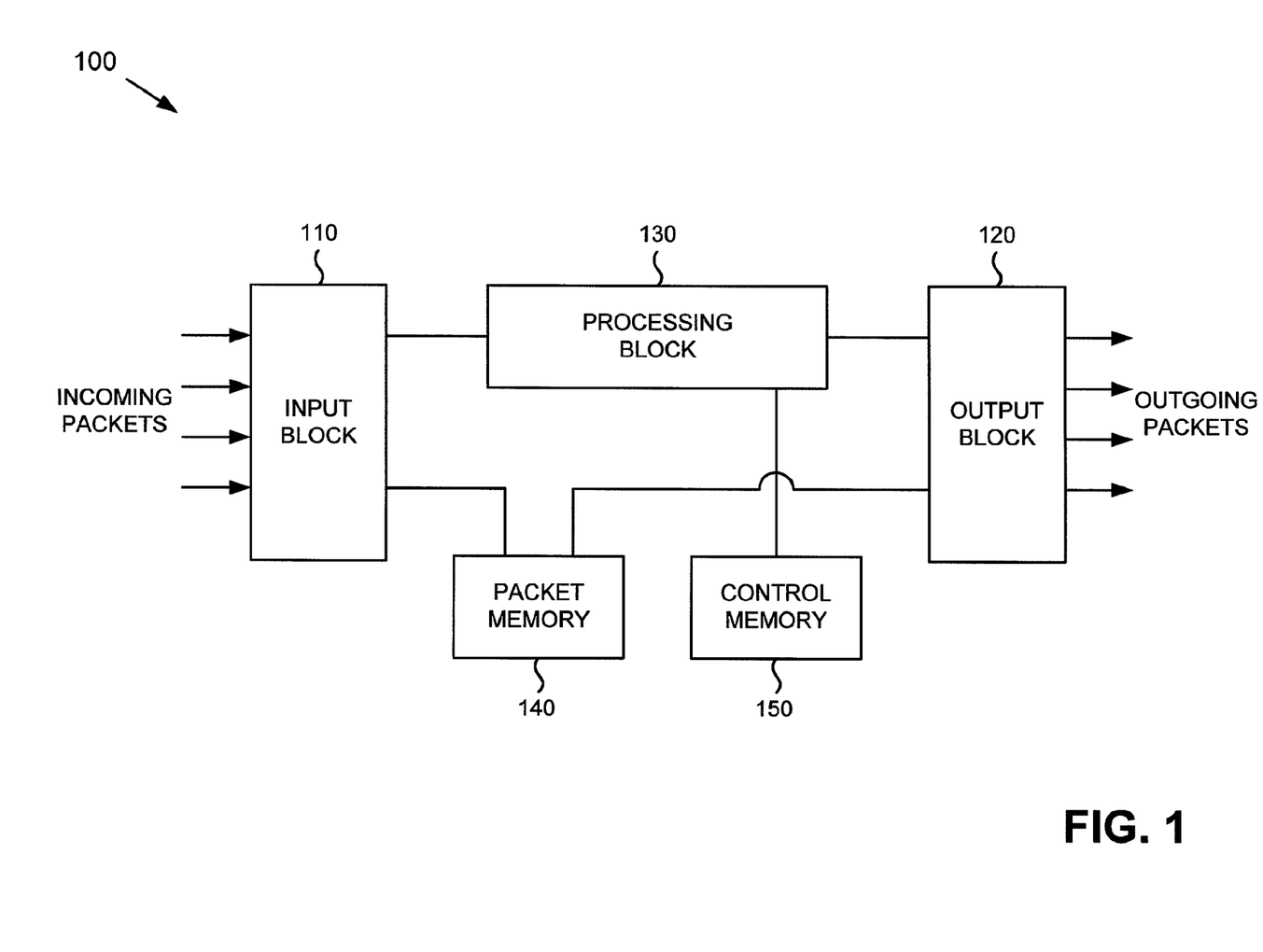
FIG. 1 is a diagram of an exemplary data processing device in which systems and methods described herein may be implemented.

FIG. 1 is a diagram of an exemplary data processing device 100 in which systems and methods described herein may be implemented. Device 100 may include an input block 110, an output block 120, a processing block 130, a packet memory 140, and a control memory 150.

Input block 110 may include one or more input units (e.g., input line cards) that may receive packets on ingress links and perform initial processing on the packets. In one implementation, the initial processing may include analyzing a packet to identify its control information and its packet data (e.g., payload). The control information may include information from a header of the packet, and the packet data may include information from a payload of the packet. In one implementation, the control information may include a source address and/or a destination address from the header of a packet. In another implementation, the control information may include a source address, a destination address, priority information, and/or other information from the header of the packet. Output block 120 may include one or more output units (e.g., output line cards) that may receive packet information from processing block 130 and/or packet memory 140, construct packets from the packet information, and output the packets on egress links.

Processing block 130 may include processing logic that may perform routing functions and handle packet transfers between input block 110 and output block 120. Processing block 130 may receive the control information from input block 110 and process the control information based on data structures stored in control memory 150. When processing the control information, processing block 130 may make certain requests to control memory 150 to read and/or write data.

Figure 2:
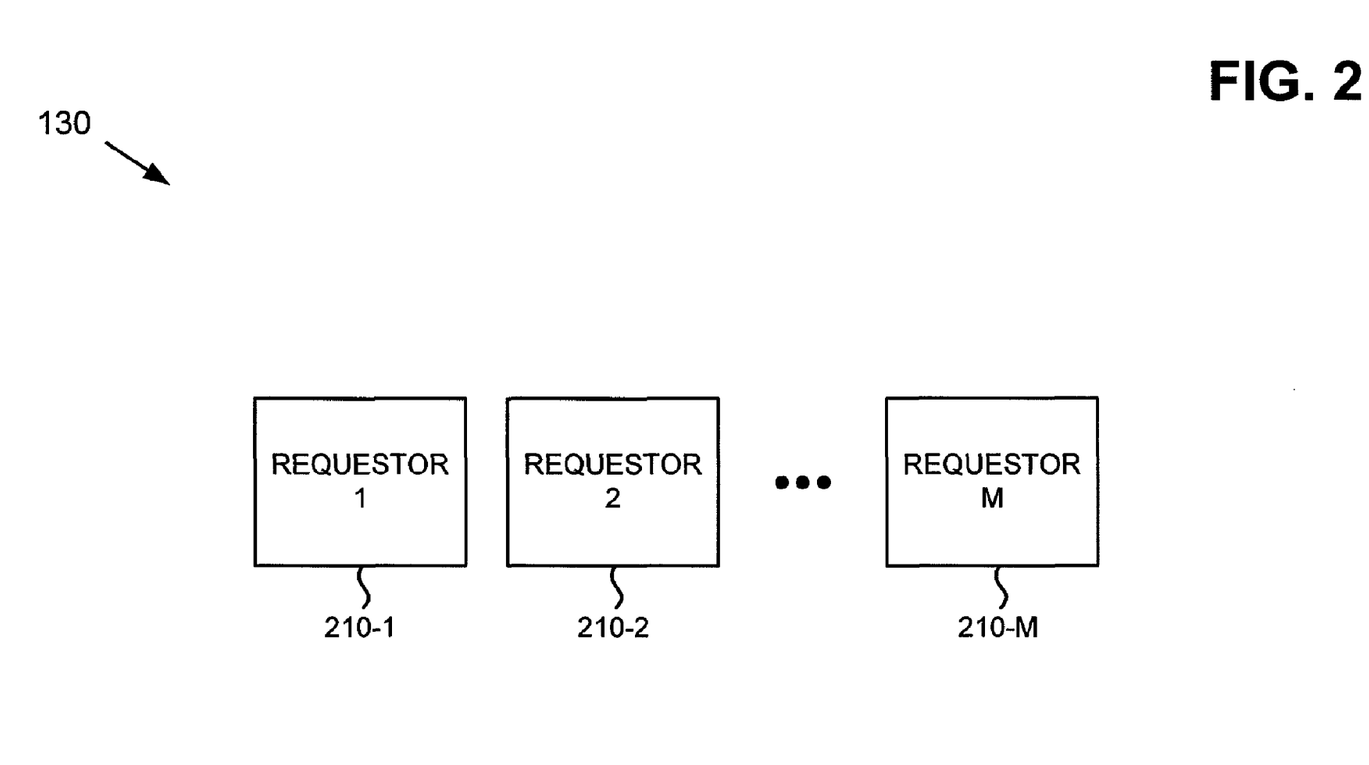
FIG. 2 is a diagram of an exemplary portion of the processing block of FIG. 1.

FIG. 2 is a diagram of an exemplary portion of processing block 130. Processing block 130 may include multiple requestors 210-1, 210-2, . . . , 210-M (where M>1) (collectively referred to herein as "requestors 210"). Requestors 210 may operate independently of each other and/or in parallel. Each requestor 210 may include processing logic to process control information associated with a particular packet. Each requestor 210 may make requests to control memory 150 to read and/or write data to assist in the processing of the control information. In one implementation, a requestor 210 may determine how to forward a packet (e.g., determine on which egress link the packet should be transmitted), collect particular statistics regarding the packet, and/or perform one or more management functions with regard to the packet.

Returning to FIG. 1, packet memory 140 may include a memory device, such as a dynamic random access memory (DRAM). Packet memory 140 may store packet data associated with packets received by input block 110. In one implementation, packet memory 140 may store the packet data as a variable length data unit. In another implementation, packet memory 140 may store the packet data as fixed length data units. In this case, the packet data may be divided into one or more of the data units of the fixed length and may be stored in contiguous or non-contiguous locations in packet memory 140. If stored in non-contiguous locations, data structures, such as linked lists, may be used to identify the data units associated with a particular packet.

Control memory 150 may include a memory device, such as a DRAM or a reduced-latency DRAM (RLDRAM). Control memory 150 may store data structures to assist in the processing of packets. In one implementation, the data structures might include a routing table, a forwarding table, statistics, and/or management data (e.g., quality of service (QoS) parameters).

Figure 3:
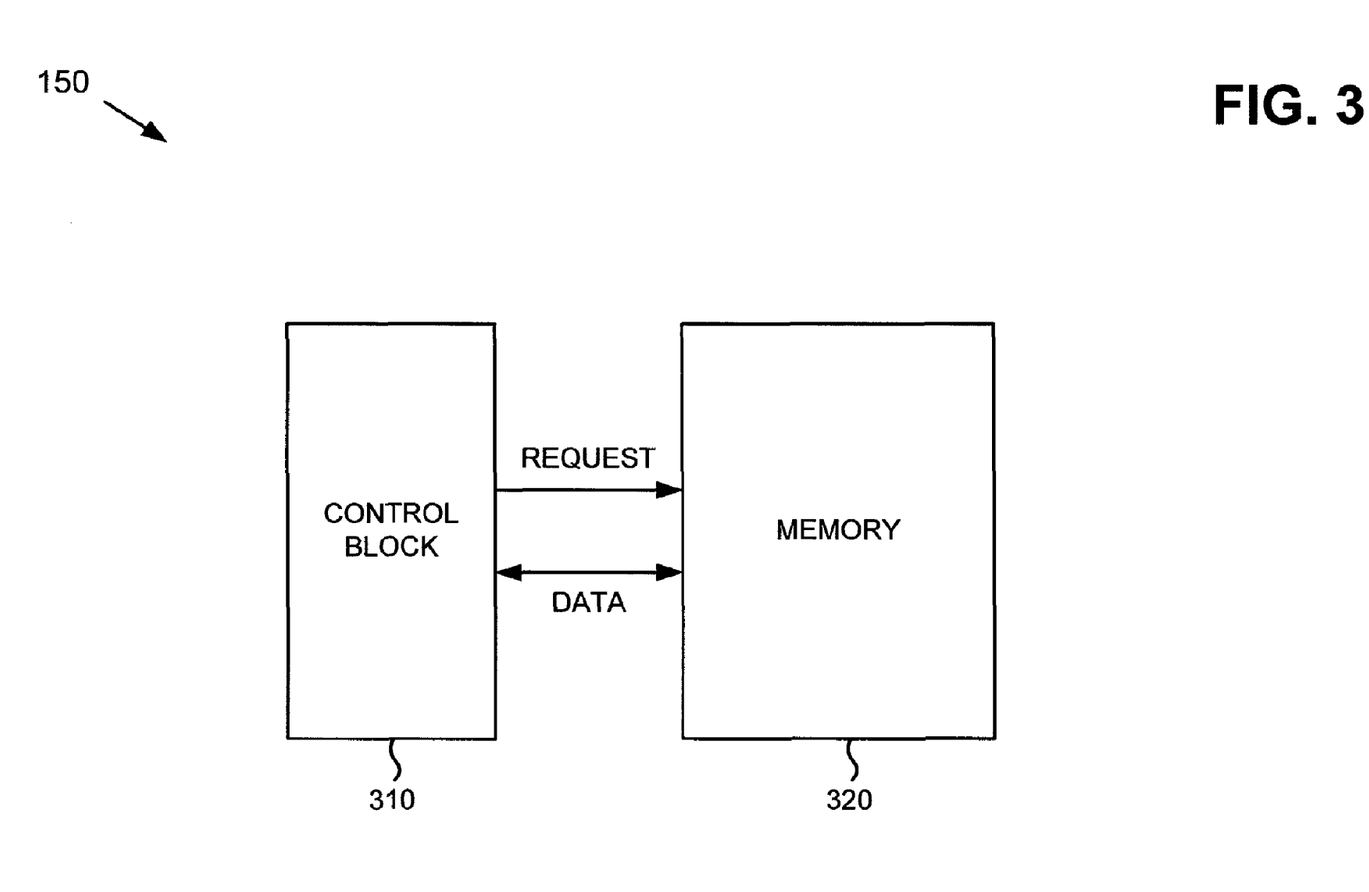
FIG. 3 is a diagram of an exemplary portion of the control memory of FIG. 1.

FIG. 3 is a diagram of an exemplary portion of control memory 150. Control memory 150 may include a control block 310 and a memory 320. Control block 310 may include logic that regulates access to memory 320. For example, control block 310 may receive requests from requestors 210 and regulate the sending of the requests to memory 320. In this case, control block 310 may function as an arbiter that arbitrates among the requests. Control block 310 may connect to memory 320 via a bus over which requests can be sent to memory 320 and data can be written to or read from memory 320.

Figure 4:
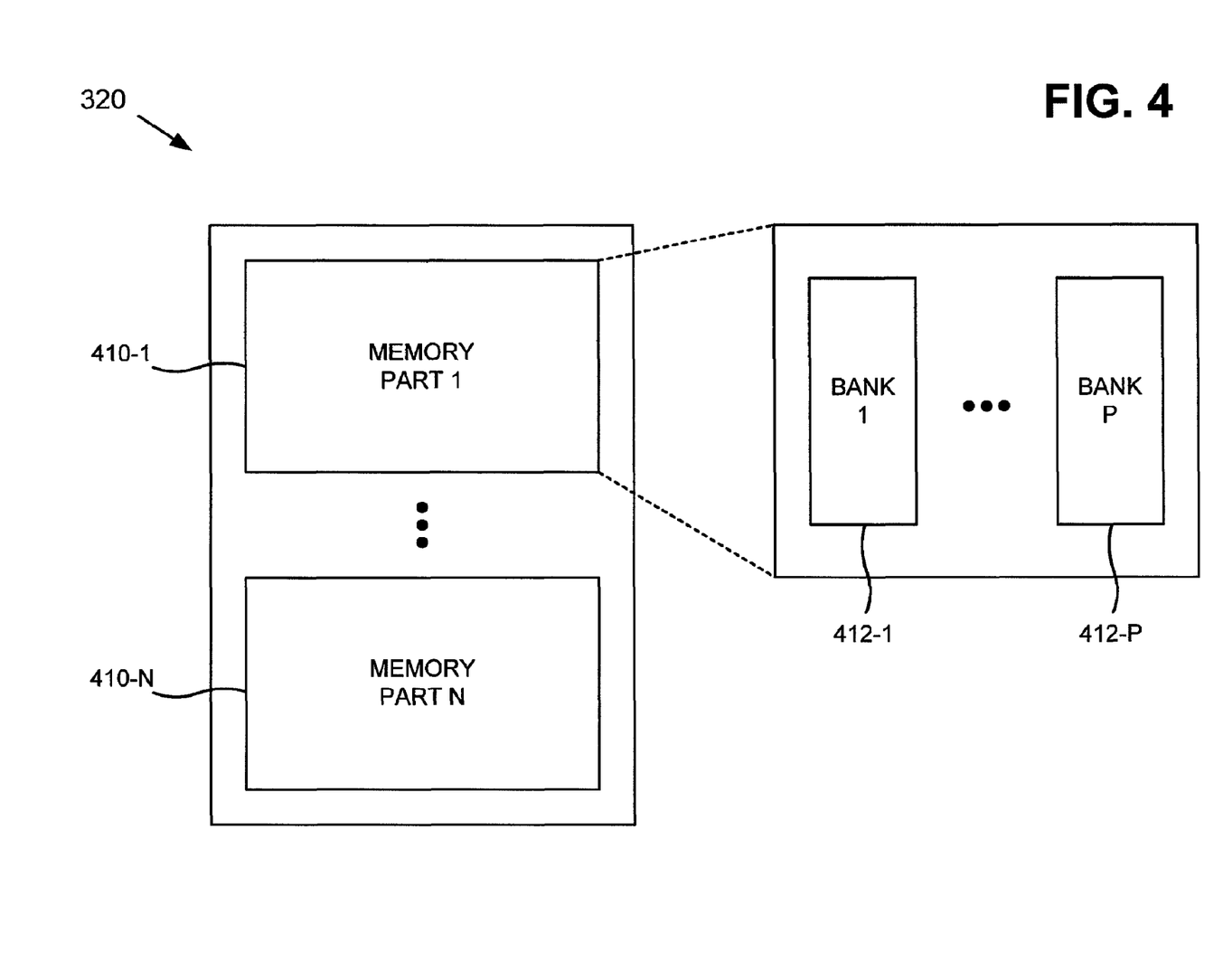
FIG. 4 is a diagram of an exemplary portion of the memory of FIG. 3.

Memory 320 may store data structures. FIG. 4 is a diagram of an exemplary portion of memory 320. Memory 320 may include memory parts 410-1, . . . , 410-N (where N>1) (collectively referred to herein as "memory parts 410"). In one implementation, each memory part 410 may store a replicated set of data. In another implementation, each memory part 410 may store a different set of data. Control block 310 may include a separate bus for each memory part 410, such that a separate request can be sent concurrently to each memory part 410. In this case, memory parts 410 may operate independently of each other. Reads may be performed on one of memory parts 410. Writes may be performed on all, or multiple ones, of memory parts 410 to maintain consistency.

Each of memory parts 410 may be organized into banks 412-1, . . . , 412-P (where P>1) (collectively referred to herein as "banks 412"). In one implementation, banks 412 may store data associated with any of requestors 210. In this case, any of requestors 210 may access any of banks 412. In another implementation, each of banks 412 may store data associated with a particular one or more of requestors 210. In this case, a particular one of banks 412 may be assigned to one or more of requestors 210.

Memory 320 may have a number of constraints that control access to memory 320. For example, memory 320 may have a restriction on how often a particular bank 412 can be accessed. For example, a restriction may specify that a certain number of clocks cycles (e.g., three clock cycles) pass between one access of a bank 412 and a subsequent access of that same bank 412 (herein referred to as "bank access delay").

Exemplary Packet Forwarding Process

Figure 5:
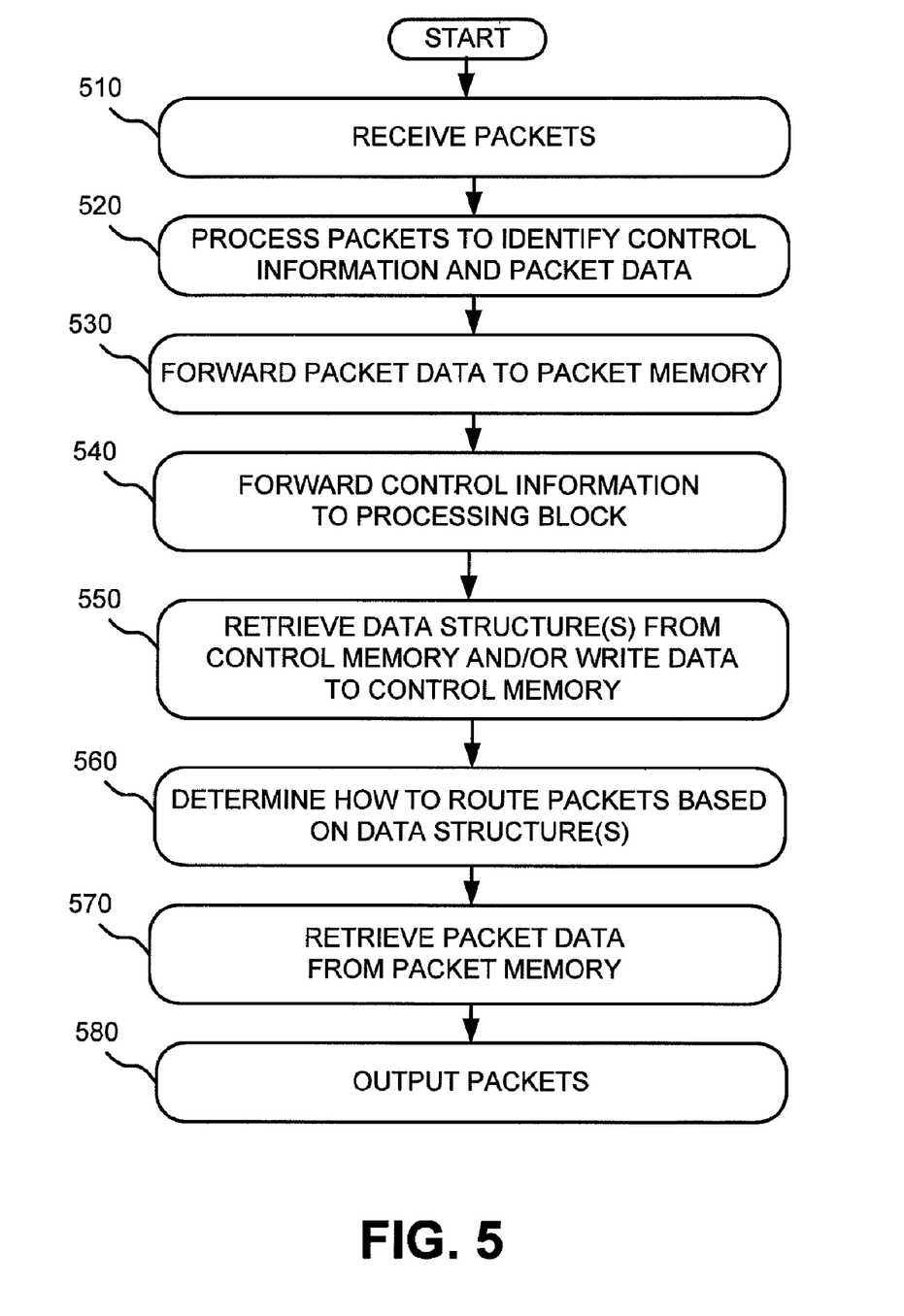
FIG. 5 is a flowchart of an exemplary process for forwarding a packet by the data processing device of FIG. 1.

FIG. 5 is a flowchart of an exemplary process for forwarding a packet by data processing device 100. Processing may begin with packets being received (block 510). For example, input block 110 may receive packets on one or more ingress links. The packets may be associated with a single stream of packets received on a particular ingress link or multiple streams of packets received on multiple ingress links.

The packets may be processed to identify their control information and their packet data (block 520). For example, input block 110 may analyze the packets to determine control information and packet data associated with the packets. As described above, the control information may be retrieved from the header of the packets and the packet data may be retrieved from the payload of the packets.

The packet data may be forwarded to packet memory 140 and the control information may be forwarded to processing block 130 (blocks 530 and 540). For example, input block 110 may send the packet data for storage in packet memory 140. As described above, the packet data associated with a particular packet may be stored in packet memory 140 as a variable sized data unit or as one or more fixed sized data units. In another example, input block 110 may forward control information to processing block 130.

One or more data structures may be retrieved from control memory 150 and/or data may be written to control memory 150 (block 550). For example, requestor 210 of processing block 130 may process control information associated with a packet. Requestor 210 may retrieve one or more data structures, such as a forwarding table, a routing table, and/or management data, from control memory 150. Requestor 210 may also, or alternatively, write one or more data structures, such as statistics data, to control memory 150. Requestor 210 may read or write data by sending a request to control memory 150. Requestors 210 may operate independently from each other and, thus, the requests from requestors 210 can form an unpredictable (almost random) access pattern across banks 412 of control memory 150.

It may be determined how to route the packets based on the one or more data structures retrieved from control memory 150 (block 560). For example, requestor 210 may process the control information for a packet based on the forwarding table, routing table, and/or management data to determine how the packet should be routed (e.g., on which egress link the packet should be transmitted, the priority to be given to the packet, etc.). Requestor 210 may send its processing results to output block 120. The processing results may identify the packet and the egress link on which the packet should be transmitted and might include header information associated with the packet.

Packet data may be retrieved from packet memory 140 (block 570). For example, output block 120 may receive processing results for a packet from a requestor 210 of processing block 130. Output block 120 may retrieve the packet data corresponding to the packet from packet memory 140 and reassemble the packet based on the packet data and the processing results from requestor 210.

The packets may be outputted on one or more egress links (block 580). For example, output block 120 may transmit the packets based on the processing results from requestors 210 of processing block 130.

Exemplary Functional Block Diagram of Control Memory

Figure 6:
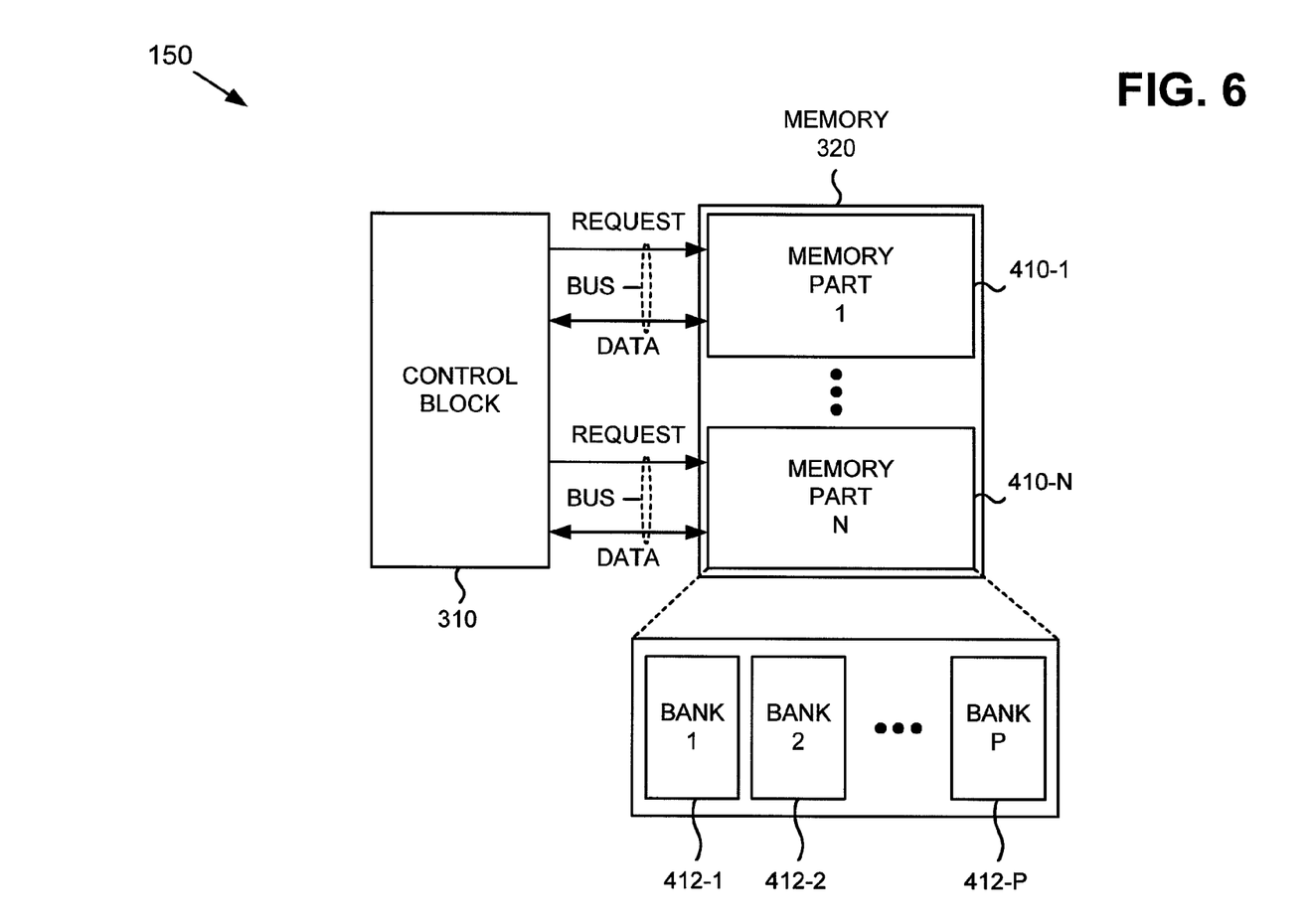
FIG. 6 is a functional block diagram of an exemplary portion of the control memory of FIG. 1.

Implementations described herein may relate generally to regulating access to control memory 150 and, more particularly, to the spreading of requests across banks 412 of control memory 150. FIG. 6 is a functional block diagram of an exemplary portion of control memory 150. As shown in FIG. 6, control memory 150 may include control block 310 and memory 320, which may include N memory parts 410 that may each include P banks 412.

Control block 310 may regulate access by requestors 210 to the data in memory parts 410 and banks 412. Control block 310 may receive requests from requestors 210. A request from a requestor 210 may include an address and a valid signal. The address may identify the location in memory 320 to read or write data. In one implementation, the lower ceiling($\log_2 P$) bits (e.g., three bits) of the address (where ceiling( ) is a function that rounds up to the nearest integer) may identify a bank 412 to be accessed. The valid signal may identify whether the request is valid.

As explained above, control block 310 may operate under certain memory constraints. For example, there may be a certain (e.g., finite) delay to access a bank 412 (e.g., a bank 412 may be inaccessible for a certain number of clock cycles after an access to that bank 412). Also, there may be a single bus between control block 310 and each of memory parts 410, as shown in FIG. 6. A single request may be sent from control block 310 to one of memory parts 410 via the bus during a given clock cycle.

Figure 7:
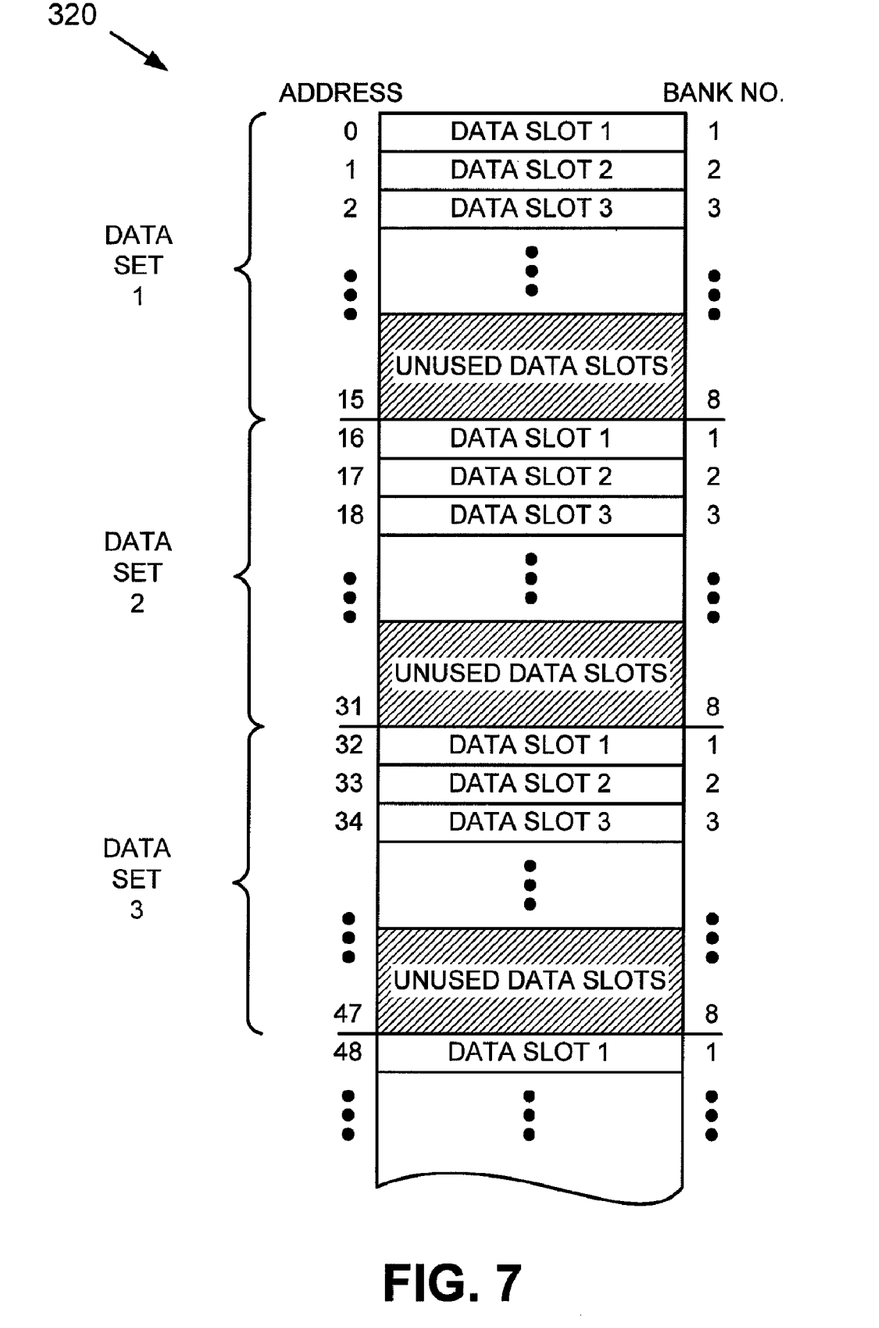
FIG. 7 is a diagram of a logical view of the memory of FIG. 6.

FIG. 7 is a diagram of a logical view of memory 320. The logical view of memory 320, as shown in FIG. 7, may correspond to a single memory part 410 or multiple memory parts 410. Assume that memory 320 allocates particular regions of the memory space to different data sets. A number of data slots may be allocated to each of the data sets. As shown in FIG. 7, sixteen data slots may be allocated to a single data set. In other implementations, more or fewer data slots may be allocated to a single data set. The data of a data set may be stored starting at some offset and moving downward in the memory space. Any data slots that are not currently used by the data set may be reserved as unused data slots for the data set.

Assume for the description herein that there are eight memory banks 412 (memory banks 1-8), an address includes 24 bits, and the lower ceiling($\log_2 P$) (e.g., three) bits of the address identify which of memory banks 412 actually stores the data in the data slot. Because the lower ceiling($\log_2 P$) bits of the address identify the bank number, the data in data slot 1 of the different data sets may be stored in the same bank (i.e., bank 1), the data in data slot 2 of the different data sets may be stored in the same bank (i.e., bank 2), etc.

Accesses to memory 320 may be in terms of a single address (corresponding to a single data slot) or multiple, sequential addresses (corresponding to multiple, sequential data slots). Because the data in the data sets start at the same memory banks 412 (e.g., banks 1-3), there may be many more accesses to these memory banks 412 and fewer accesses to the other memory banks 412. This may create an inefficient use of memory 320 due to bank access delay constraints.

Accordingly, a map function may be used to maintain the sequential nature of some of the memory accesses (e.g., to sequential addresses or data slots) while mapping non-sequential accesses for the same memory bank 412 (e.g., multiple addresses or data slots corresponding to the same memory bank 412) to different memory banks 412. For example, suppose that ten requests to memory 320 are directed to the following memory banks 412: bank 7, bank 8, bank 1, bank 2, bank 3, bank 5, bank 5, bank 5, bank 2, and bank 4. Due to the bank access delay constraint, clock cycles may be lost after the first and second accesses to bank 5, thereby decreasing the efficiency of the memory accesses. Suppose that these ten requests were mapped according to a map function (to be described herein) such that the requests are now directed to the following memory banks: bank 6, bank 7, bank 8, bank 1, bank 2, bank 5, bank 6, bank 8, bank 3, and bank 4. In this case, the sequential accesses (banks 7-8-1-2-3) are maintained (banks 6-7-8-1-2) while the non-sequential accesses to the same bank (bank 5-5-5) has been spread across different banks (banks 5-6-8).

Figure 8:
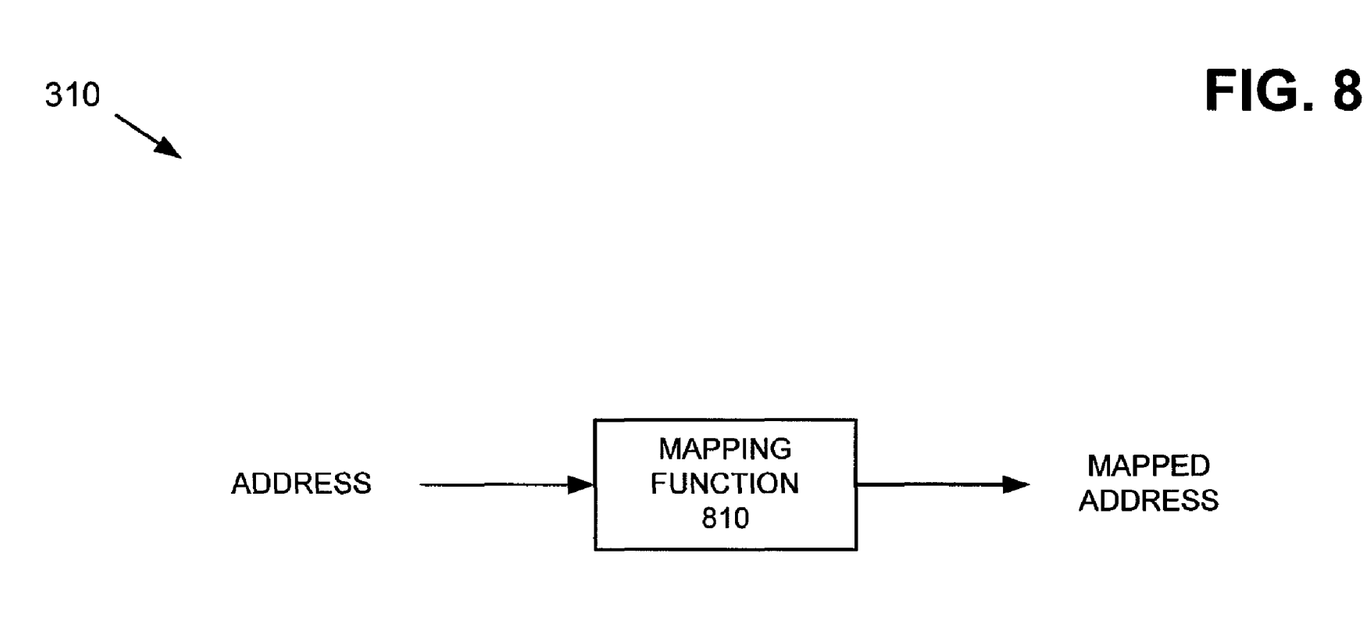
FIG. 8 is a diagram of an exemplary portion of the control block of FIG. 6.

FIG. 8 is a diagram of an exemplary portion of control block 310. As shown in FIG. 8, control block 310 may include a mapping function 810. Mapping function 810 may include hardware or software that may perform a hashing function, possibly in the form of a logic operation and/or a swapping operation, on one or more bits of an address to transform the address to a mapped address. The mapped address may maintain sequential accesses to memory banks 412 and spread non-sequential accesses for the same memory bank 412 to different memory banks 412.

In one implementation, mapping function 810 may perform an exclusive OR (XOR) operation on a higher order bit (e.g., bit four or bit five) and a lower order bit (e.g., bit zero or bit one). In another implementation, mapping function 810 may perform an XOR operation on multiple higher order bits and lower order bits (e.g., bit five $\oplus$ bit one and bit four $\oplus$ bit zero). In yet another implementation, mapping function 810 may perform an XOR operation on one or more higher order bits and one or more lower order bits (e.g., bit five $\oplus$ bit one and/or bit four $\oplus$ bit zero), and may swap one or more high order bits (e.g., bit twenty-three) with one or more low order bits (e.g., bit two). The particular bits that are subjected to the XOR operation and/or the swapping operation may be programmable and may be based on design and/or performance considerations.

Exemplary Process

Figure 9:
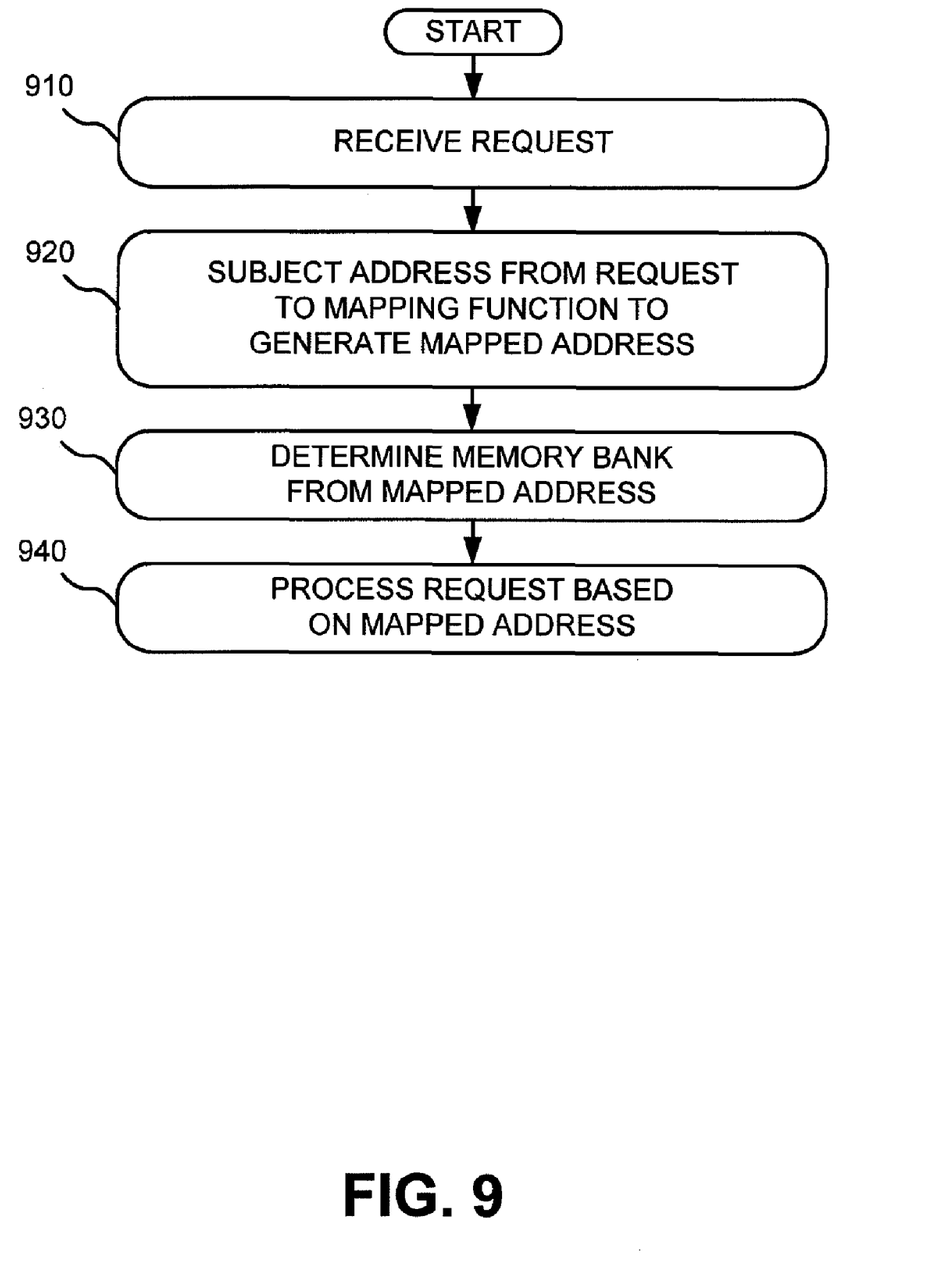
FIG. 9 is a flowchart of an exemplary process for processing a request to access a memory bank of FIG. 6.

FIG. 9 is a flowchart of an exemplary process for processing a request to access a memory bank 412. The process may begin with a request being received (block 910). For example, control block 310 may receive a request from a requestor 210. As explained above, the request may include an address that identifies the memory location for which the request is intended. Control block 310 may extract the address from the request.

The address may be subjected to a mapping function to generate a mapped address (block 920). For example, mapping function 810 may perform a logic operation and/or a swapping operation on the address to generate the mapped address. In one implementation, mapping function 810 may perform an XOR operation on one or more higher order bits of the address and one or more lower order bits of the address, and/or may swap a high order bit with a low order bit of the address.

Figure 10:
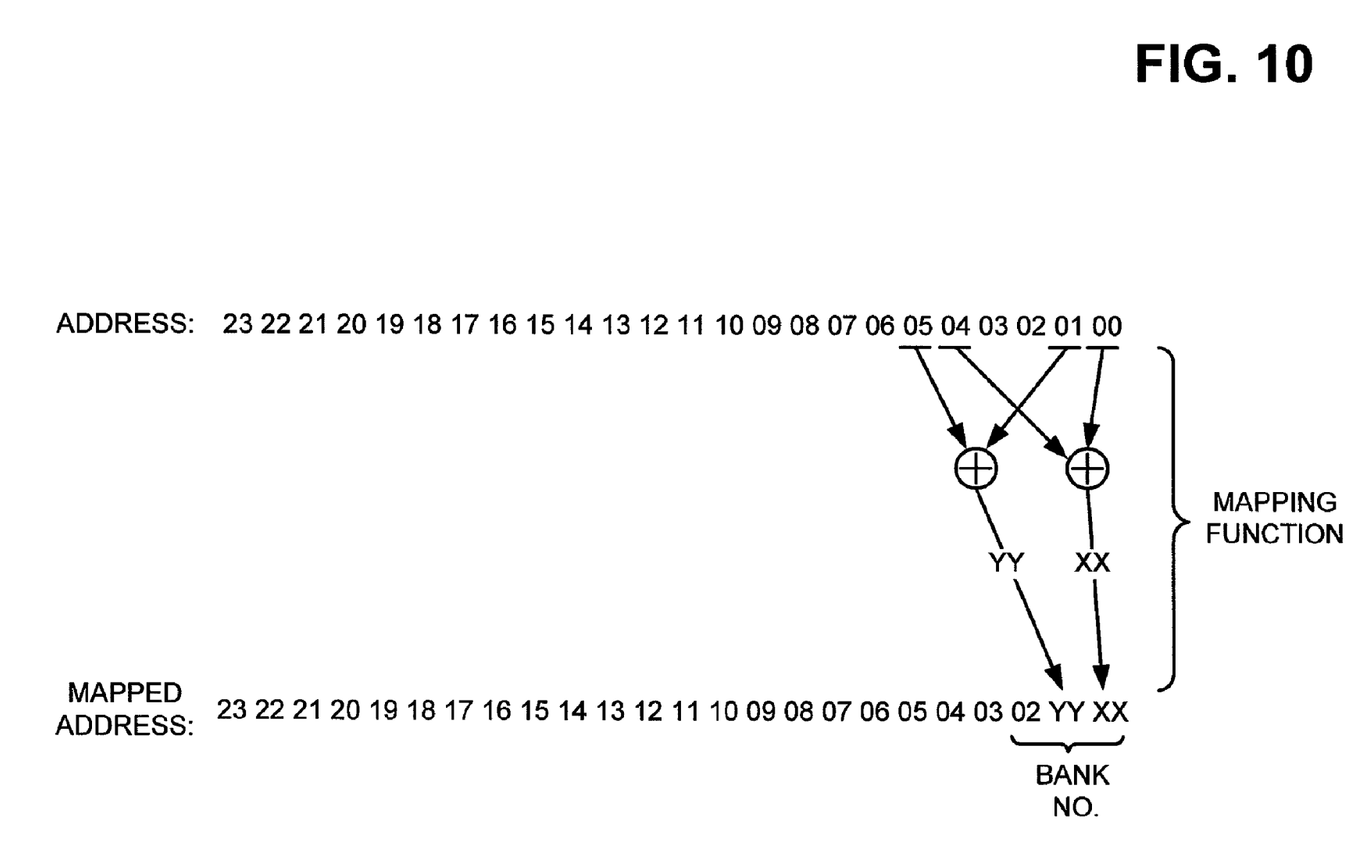
FIG. 10 is a diagram of a first exemplary mapping function.

FIG. 10 is a diagram of a first exemplary mapping function 810. As shown in FIG. 10, mapping function 810 may perform an XOR operation on bit four and bit zero of the address and/or bit five and bit one of the address. The result of the XOR operation on bit four and bit zero ("XX") may be used as bit zero of the mapped address and/or the result of the XOR operation on bit five and bit one ("YY") may be used as bit one of the mapped address. The mapped address may maintain sequential accesses (e.g., to sequential addresses) to memory banks 412 and spread non-sequential accesses for the same memory bank 412 (e.g., to random addresses intended for the same memory bank 412) to different memory banks 412.

Figure 11:
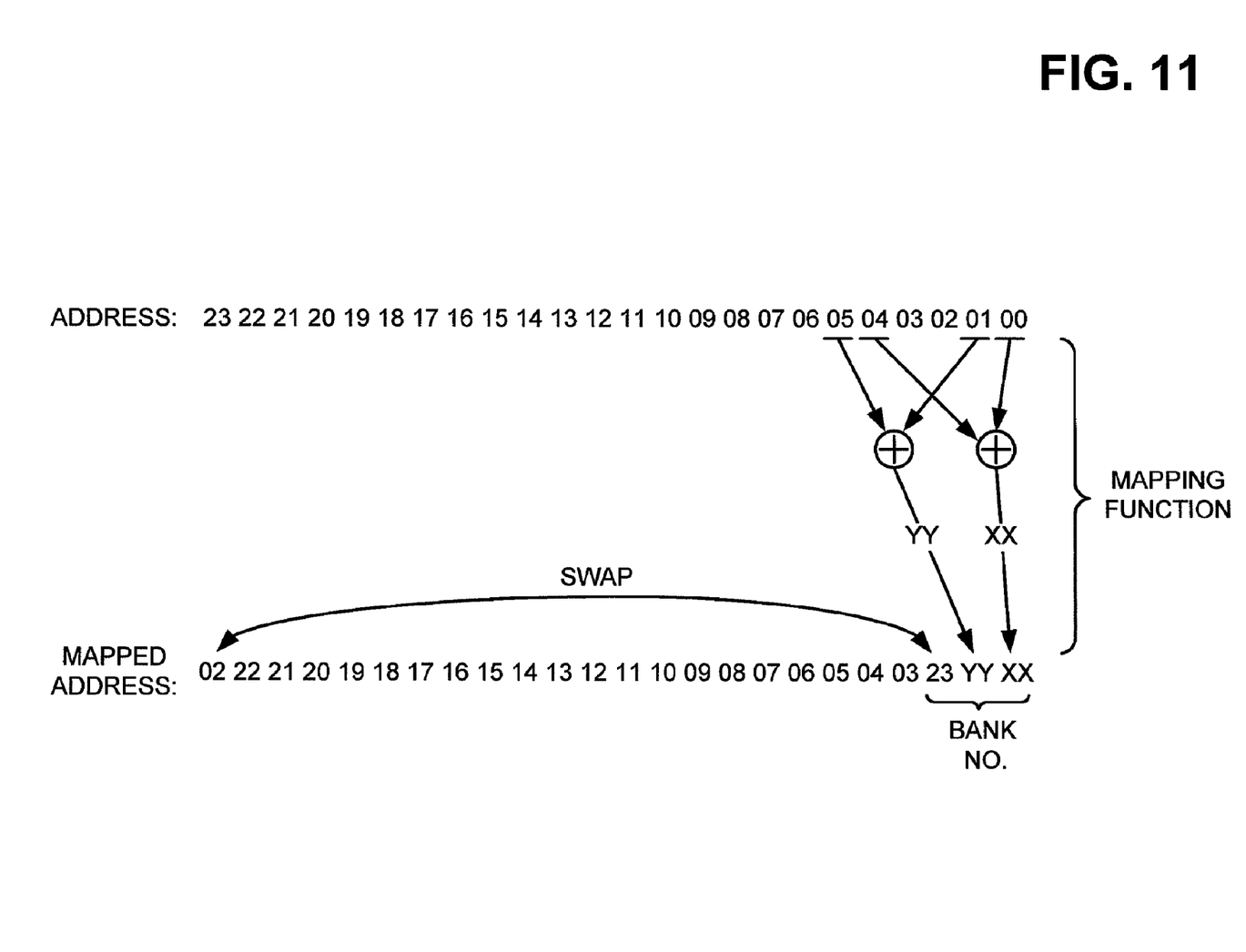
FIG. 11 is a diagram of a second exemplary mapping function.

FIG. 11 is a diagram of a second exemplary mapping function 810. As shown in FIG. 11, mapping function 810 may perform an XOR operation on bit four and bit zero of the address and/or bit five and bit one of the address, and may perform a swapping operation to swap bit twenty-three and bit two. The result of the XOR operation on bit four and bit zero ("XX") may be used as bit zero of the mapped address and/or the result of the XOR operation on bit five and bit one ("YY") may be used as bit one of the mapped address. Bit twenty-three may be used as bit two of the mapped address and bit two may be used as bit twenty-three of the mapped address. The mapped address may maintain sequential accesses to memory banks 412 and spread non-sequential accesses for the same memory bank 412 to different memory banks 412.

Returning to FIG. 9, a memory bank 412 to process the request may be determined from the mapped address (block 930). In the implementation shown in FIG. 10, the lower three bits (i.e., [2, YY, XX]), for example, of the mapped address may be used to identify a memory bank 412. In the implementation shown in FIG. 11, the lower three bits (i.e., [23, YY, XX]), for example, of the mapped address may be used to identify a memory bank 412.

The request may be processed based on the mapped address (block 940). For example, control block 310 may arbitrate the request with other requests received by control block 310. If the request is a read request, control block 310 may read data based on the mapped address from the determined one of memory banks 412. If the request is a write request, control block 310 may write data based on the mapped address to the determined one of memory banks 412.

Figure 12:
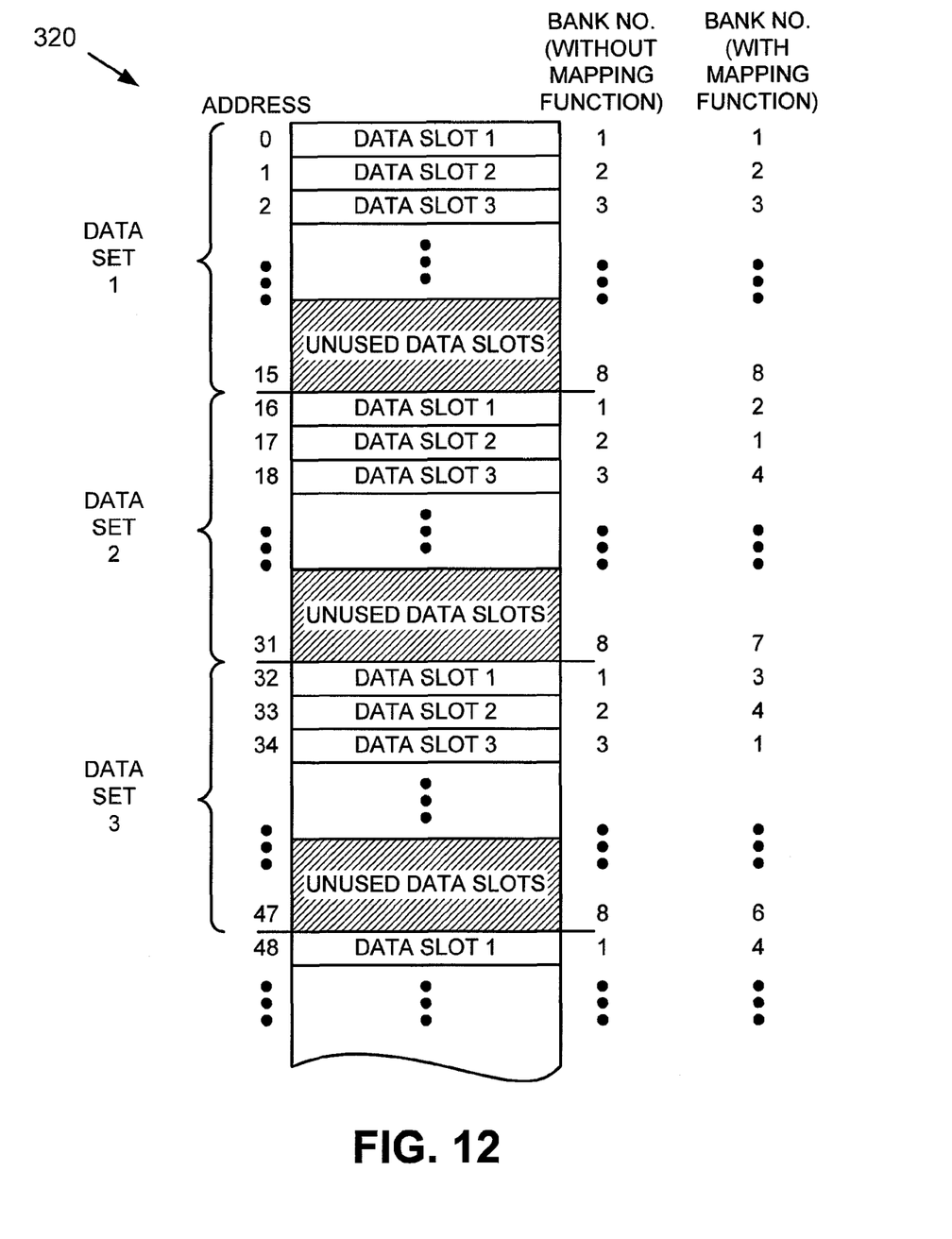
FIG. 12 is a diagram of a logical view of the memory of FIG. 6 that shows corresponding bank numbers with and without performing the mapping function.

FIG. 12 is a diagram of a logical view of memory 320 that shows corresponding bank numbers with and without performance of the mapping function. The logical view of memory 320, as shown in FIG. 12, may correspond to the logical view of memory 320, as shown in FIG. 7. In FIG. 12, however, bank assignments may be shown without mapping function 810 and with mapping function 810.

As shown in FIG. 12, the data in the data sets no longer start at the same memory banks 412, thereby spreading the accesses across memory banks 412. This creates an efficient use of memory 320 even when subjected to bank access delay constraints.

CONCLUSION

Implementations described herein may provide techniques for efficiently servicing requests by a memory device. These techniques may map a set of memory addresses to another set of memory addresses such that accesses to the memory device may be spread across memory banks. The mapped set of memory addresses may ensure that contiguous addresses are maintained and that random addresses are spread.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 9, the order of the blocks may differ in other implementations. Also, non-dependent blocks may be performed in parallel.

Further, certain portions of the description referred to "logic" that performs one or more functions. This logic may include hardware, such as a processor, an application specific integrated circuit, or a field programmable gate array, software, or a combination of hardware and software.

Moreover, reference has been made to "high order," "higher order," "low order," and "lower order" bits of an address with the understanding that "high" is relative to "low" and "higher" is relative to "lower." In other words, a "high" or "higher" order bit of an address is a more significant bit of the address than a "low" or "lower" order bit of the address.

It will also be apparent that aspects, as described above, may be implemented in many different forms of software, firmware, and hardware in the implementations illustrated in the figures. The actual software code or specialized control hardware used to implement aspects described herein is not limiting of the invention. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A data processing device, comprising:
a plurality of requestors issuing requests;
a memory that includes a plurality of memory banks; and
a control block to:

receive a request from one of the requestors, the request including a first address, perform a boolean logic operation on a high order bit and a low order bit of the first address, and perform a swapping operation to swap another high order bit with another low order bit of the first address, and form a second address by:
replacing the low order bit of the first address with a result of the boolean logic operation, and
using the swapped other high order bit and other low order bit, identify one of the memory banks based on the second address, and send the request to the identified memory bank.

2. The data processing device of claim 1, where when performing the boolean logic operation, the control block performs an exclusive OR operation on the high order bit and the low order bit.

3. The data processing device of claim 1, where at least one of the high order bit, the low order bit, the other high order bit, or the other low order bit is programmable.

4. The data processing device of claim 1, where when identifying the one of the memory banks, the control block uses a set of low order bits of the second address to determine the one of the memory banks, the set of the low order bits including a result of the boolean logic operation and the other high order bit.

5. The data processing device of claim 1, where when identifying the one of the memory banks, the control block uses a set of low order bits of the second address to determine the one of the memory banks, the set of the low order bits including a result of the boolean logic operation.

6. The data processing device of claim 1, where when performing the boolean logic operation, the control block performs a first boolean logic operation on a first high order bit and a first low order bit of the first address, and a second boolean logic operation on a second high order bit and a second low order bit of the first address.

7. The data processing device of claim 6, where the first boolean logic operation includes a first exclusive OR operation, and the second boolean logic operation includes a second exclusive OR operation.

8. The data processing device of claim 6, where at least one of the first high order bit, the first low order bit, the second high order bit, or the second low order bit is programmable.

9. The data processing device of claim 6, where the control block is further to perform the swapping operation to swap a third high order bit with a third low order bit of the first address.

10. The data processing device of claim 9, where at least one of the first high order bit, the first low order bit, the second high order bit, the second low order bit, the third high order bit, or the third low order bit is programmable.

11. The data processing device of claim 9, where when identifying the one of the memory banks, the control block uses a set of low order bits of the second address to determine the one of the memory banks, the set of the low order bits including a result of the first boolean logic operation, a result of the second boolean logic operation, and the third high order bit.

12. The data processing device of claim 6, where when identifying the one of the memory banks, the control block uses a set of low order bits of the second address to determine the one of the memory banks, the set of the low order bits including a result of the first boolean logic operation and a result of the second boolean logic operation.

13. The data processing device of claim 1, where the high order bit and the low order bit are programmable.

14. The data processing device of claim 1, where data is stored in the memory as data sets starting at a plurality of predetermined address offsets in an address space of the memory.

15. A data processing device, comprising:
a plurality of requestors issuing requests;
a memory that includes a plurality of memory banks; and
a control block to:
receive a request from one of the requestors, the request including a first address,
perform a mapping function on the first address to form a second address, the mapping function causing a set of contiguous addresses to be mapped to another set of contiguous addresses while spreading a set of non-contiguous addresses intended for a same one of the memory banks to multiple ones of the memory banks,
perform, when performing the mapping function, a boolean logic operation on a high order bit and a low order bit of the first address and a swapping operation on another high order bit and another low order bit of the first address,
replace, when performing the mapping function, the low order bit of the first address with a result of the boolean logic operation and the other low order bit of the first address with the other high order bit of the first address to form the second address,
identify one of the memory banks based on the second address, and send the request to the identified memory bank.

16. The data processing device of claim 15, where the boolean logic operation is an exclusive OR operation.

17. The data processing device of claim 15, where when performing the mapping function, the control block is further to:
perform a first boolean logic operation on a first high order bit and a first low order bit of the first address,
perform a second boolean logic operation on a second high order bit and a second low order bit of the first address, and
replace the first low order bit of the first address with a result of the first boolean logic operation and the second low order bit of the first address with a result of the second boolean logic operation to form the second address.

18. A method, comprising:
receiving a request to read data from or write data to a memory that includes a plurality of memory banks, the request including a first address;
performing a boolean logic operation on a high order bit and a low order bit of the first address;
performing a swapping operation to swap another high order bit with another low order bit of the first address;
forming a second address by:
replacing the low order bit of the first address with a result of the boolean logic operation, and
using the swapped other high order bit and other low order bit;
identifying one of the memory banks based on the second address; and
sending the request to the identified memory bank.

19. The method of claim 18, where performing the boolean logic operation includes performing an exclusive OR operation on the high order bit and the low order bit.

20. The method of claim 18, where at least one of the high order bit, the low order bit, the other high order bit, or the other low order bit is programmable.

21. The method of claim 18, where identifying the one of the memory banks includes:
using a set of low order bits of the second address to determine the one of the memory banks, the set of the low order bits including a result of the boolean logic operation and the swapped high order bit.

22. The method of claim 18, where identifying the one of the memory banks includes:
using a set of low order bits of the second address to determine the one of the memory banks, the set of the low order bits including a result of the boolean logic operation.

23. The method of claim 18, where performing the boolean logic operation includes:
performing a first boolean logic operation on a first high order bit and a first low order bit of the first address, and
performing a second boolean logic operation on a second high order bit and a second low order bit of the first address.

24. The method of claim 23, where performing the first boolean logic operation includes performing a first exclusive OR operation, and performing the second boolean logic operation includes performing a second exclusive OR operation.

25. The method of claim 23, where at least one of the first high order bit, the first low order bit, the second high order bit, or the second low order bit is programmable.

26. The method of claim 23, further comprising:
performing the swapping operation to swap a third high order bit with a third low order bit of the first address; and
where forming the second address further includes:
forming the second address using the swapped third high order bit and third low order bit.

27. The method of claim 26, where at least one of the first high order bit, the first low order bit, the second high order bit, the second low order bit, the third high order bit, or the third low order bit is programmable.

28. The method of claim 26, where identifying the one of the memory banks includes:
using a set of low order bits of the second address to determine the one of the memory banks, the set of the low order bits including a result of the first boolean logic operation, a result of the second boolean logic operation, and the third high order bit.

29. The method of claim 23, where identifying the one of the memory banks includes:
using a set of low order bits of the second address to determine the one of the memory banks, the set of the low order bits including a result of the first boolean logic operation and a result of the second boolean logic operation.

30. The method of claim 18, where the high order bit and the low order bit are programmable.

* * * * *